Gordon & Pettengill,
Trade Buckle.

№ 82,709. Patented Oct. 6, 1868.

Witnesses
Jno. D. Patten
Thos. Jewell

Inventor
Wm. W. Gordon
&
D. Pettengill
By Attorneys
J. B. Woodruff & Son

United States Patent Office.

WILLIAM W. GORDON AND DEXTER PETTENGILL, OF DELHI, NEW YORK.

Letters Patent No. 82,709, dated October 6, 1868.

IMPROVED TRACE-BUCKLE.

The Schedule referred to in these Letters Patent and making part of the same.

TO ALL WHOM IT MAY CONCERN:

Be it known that we, WILLIAM W. GORDON and DEXTER PETTENGILL, both of the town of Delhi, in the county of Delaware, in the State of New York, have invented a new and useful Improvement in Trace-Buckles for harnesses; and the following is a full, clear, and exact description of the same, reference being had to the accompanying drawings, making a part of this specification, in which—

Figure 1:
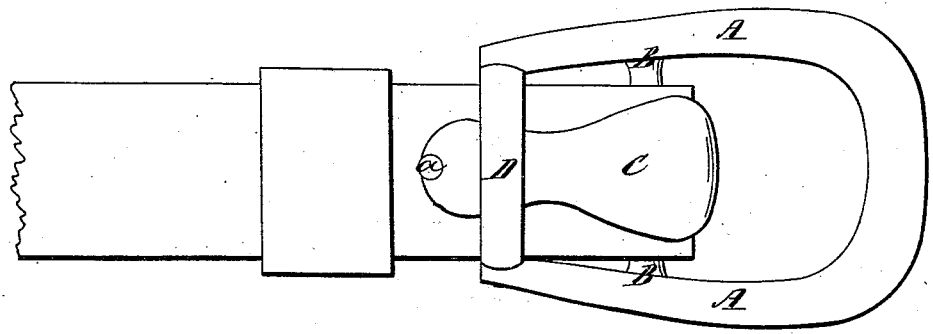
Figure 1 represents a face or outside view of the buckle attached to the hames-strap.
Figure 2:
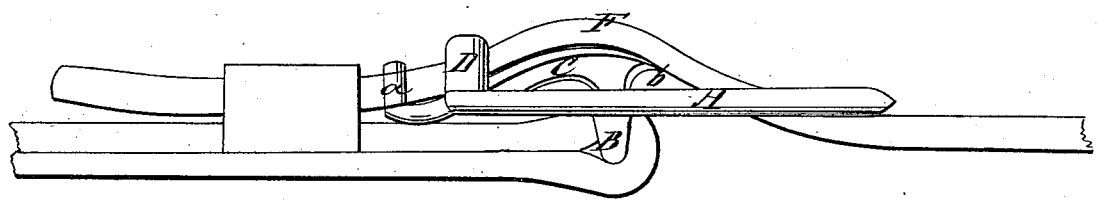
Figure 2 shows an edge view of the same, with the trace in its place, shown in red lines.
Figure 3:
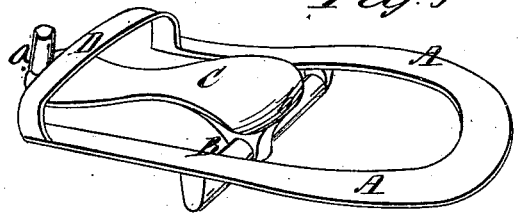
Figure 3 is a perspective view of our improved trace-buckle.

The nature of our invention consists in combining a clamping-tongue plate, C, figs. 1, 2, and 3, with the frame of a common centre or three-bar buckle, A, figs. 1 and 3, in such a manner as to form a double or compound lever-buckle, in which the fulcra of the frame and clamping-tongue plate have a common axial line The cam-shaped clamping-plate C, figs. 1, 2, and 3, is provided with a straight tongue, stud, or pin, a, figs. 1, 2, and 3, made to fit into corresponding holes in the trace, and is made with one standard only, on its under side, near the rear end, as shown in fig. 3. The end of this standard is bent around the centre bar, B, figs. 2 and 3, of the buckle-frame, in the same manner as any common tongue, being left sufficiently loose to move easily on it. The front end of this clamping or tongue-plate is placed under the front bar, and the rear end is elevated over and is attached to the centre bar of the frame by the standard, as shown in fig. 3. The frame A, figs. 1 and 3, is made in the same manner as the centre or three-bar buckle-frames commonly used for trace-buckles.

The mode of application is as follows:

The tug or hames-strap E, fig. 1, is passed around and secured to the centre bar, B, of the buckle-frame A, fig. 1, in the same manner as in common centre-bar buckles, and has a slot cut in it, the same as is cut for a common tongue, to allow the standard of the clamping or tongue-plate C to move easily in it on the centre bar of the frame, care being taken also to allow the centre bar to move freely in the strap. The trace-strap F, fig. 2, is passed under the rear bar of the buckle-frame, over and along the top of the tongue-plate C, and under the front bar, D, of the buckle-frame, (the tongue, a, of the clamping-plate passing through the trace-stap,) as shown in fig. 2.

The object of our invention is to simplify the construction of a lever trace-buckle, making a common centre or three-bar buckle answer all the purposes of the more complicated lever-buckles (with frames made exclusively on purpose) now in use; and further, to make it even more powerful and secure, by causing both the tongue-plate and frame to act as independent levers, thus making it a double or compound instead of a simple lever-buckle; for, when the strain comes upon the trace and tug-straps, the rear end of the buckle-frame is forced out by the straightening of the trace, and as the centre bar of the buckle-frame has liberty of motion (in the manner of a hinge) in the end of the tug or hames-strap, acting, in fact, as the fulcrum of a lever, the front bar of the frame A is forced down, and presses the trace-strap F firmly against the cam-shaped tongue-plate C; but this is not the only result produced, for, as the trace passes over the cam-shaped tongue-plate C, and the strain tends to draw the tug and trace-straps apart, the strain and pull on the trace-strap, by its action on the rear end, b, and tongue a of the cam-shaped tongue-plate C, draws the front end of the plate up, and presses the trace-strap firmly against the front bar, D, of the buckle-frame, at the same time that the action of the trace is pressing the front bar of the buckle-frame down, thus forming a double or compound lever-buckle.

Now, we are aware that buckles have been made in which the frame acts as a lever, to retain the trace-strap, as, for instance, the patented buckles of Henry Hiss and George Purple; but in those buckles the tongue-plate is constructed differently, and is attached to (and, in fact, is practically a part of) the tug or hames-strap, and has no independent motion apart from it, the outside frame alone having an independent motion; and they are, therefore, distinct and different from ours, in which the clamping or tongue-plate has an independent motion in itself, apart from both the tug-strap and outside frame. The action of the frame of the Hiss and Purple buckles is simply to press the trace-strap down on to the tug or hames-strap, to which the tongue-plate is fast and immovable, while in our buckle the clamping or tongue-plate, being also movable, is drawn up by the action of the trace-strap, which it presses firmly against the front bar of the buckle-frame, at the same time that the front bar of the frame itself is pressing down, thus forming a double or compound lever-buckle entirely distinct in its character from the above-mentioned buckles of Hiss and Purple, which are simple lever-buckles only.

We are also aware that lever-buckles (so called) have been made and commonly used, in which the leverage is obtained by the clamping or tongue-plate only, the frame being attached to the tug or hames-strap at its front end, by means of a bar used exclusively for that purpose, and is, in no sense of the word, a lever in itself, and does not act as such. Of this class is the old common lever-buckle, the Benedict, Pond, Fisher, and other improvements (so called) on the same; but we consider our buckle different in its construction and action from all buckles of that class in this, that the frame of our buckle, being attached to the tug or hames-strap by (and having an independent motion on) its centre bar, acts as a lever in itself, independent of the clamping or tongue-plate.

The construction and arrangement of the clamping-plate are also different from ours, being, in them, placed entirely behind the end of the hames-strap, and receiving no support or aid from it, and are generally provided with two standards, (one at each side,) working on a centre bar or pin made expressly for that purpose, which centre bar or pin has no connection (except through the medium of the frame) with the tug or hames-strap; while the clamping or tongue-plate of our buckle is made with one standard only, which passes through a slot in the centre of the hames-strap, at its rear end, and works on the centre bar of the frame, which centre bar itself works in the end of the hames-strap over which the front end of the clamping-plate extends.

The advantages of this construction and arrangement of the clamping or tongue-plate, in our buckle, will be apparent when we consider the action of the strain upon the tug or hames-strap; for, if the rear end of the buckle-frame be made sufficiently long (or the strain is of such a nature) to cause a preponderance of pressure at the front bar of the frame, the tug or hames-strap itself will act as a lever of the second order, having its fulcrum at the centre bar of the buckle-frame, and will support and aid the leverage of the front end of the clamping or tongue-plate. This action of the hames-strap, as a lever of the second order, is entirely wanting in the above-mentioned class of lever-buckles, (so called,) having their frames attached to the hames-strap by a front bar. In them the clamping-plate alone acts as a retaining-lever, and they are thus essentially different in their character from ours, in which the frame and clamping-plate each act as independent levers, to retain the trace-strap, receiving, at the same time, support and aid from the hames-strap.

Another peculiarity of our buckle is, that the central point of strain, as well as the centres of the fulcra of the frame, clamping-plate, and hames-strap, are all in the same axial line. This peculiar arrangement exists in no other trace-buckle that we are aware of.

We do not claim as new, either the tongue-plate C or common centre-bar buckle-frame A, separately, both having been long in common use as parts of other buckles, though differing from ours in arrangement and results produced.

What we do claim as our invention, and desire to secure by Letters Patent, is—

The combination and peculiar arrangement of the frame A, tongue-plate C, and tug-strap E, in the manner and for the purposes set forth in the above specifications.

In testimony whereof, we hereunto subscribe our names, in the presence of—

WM. W. GORDON.
D. PETTENGILL.

Witnesses:
   A. H. TEN BROECK,
   G. E. MARVINE.